Aug. 29, 1944.  R. B. HINES  2,356,845
GAS ANALYZING APPARATUS
Filed Aug. 14, 1941  4 Sheets-Sheet 1

Inventor
ROBERT B. HINES
By Raymond D. Junkins
Attorney

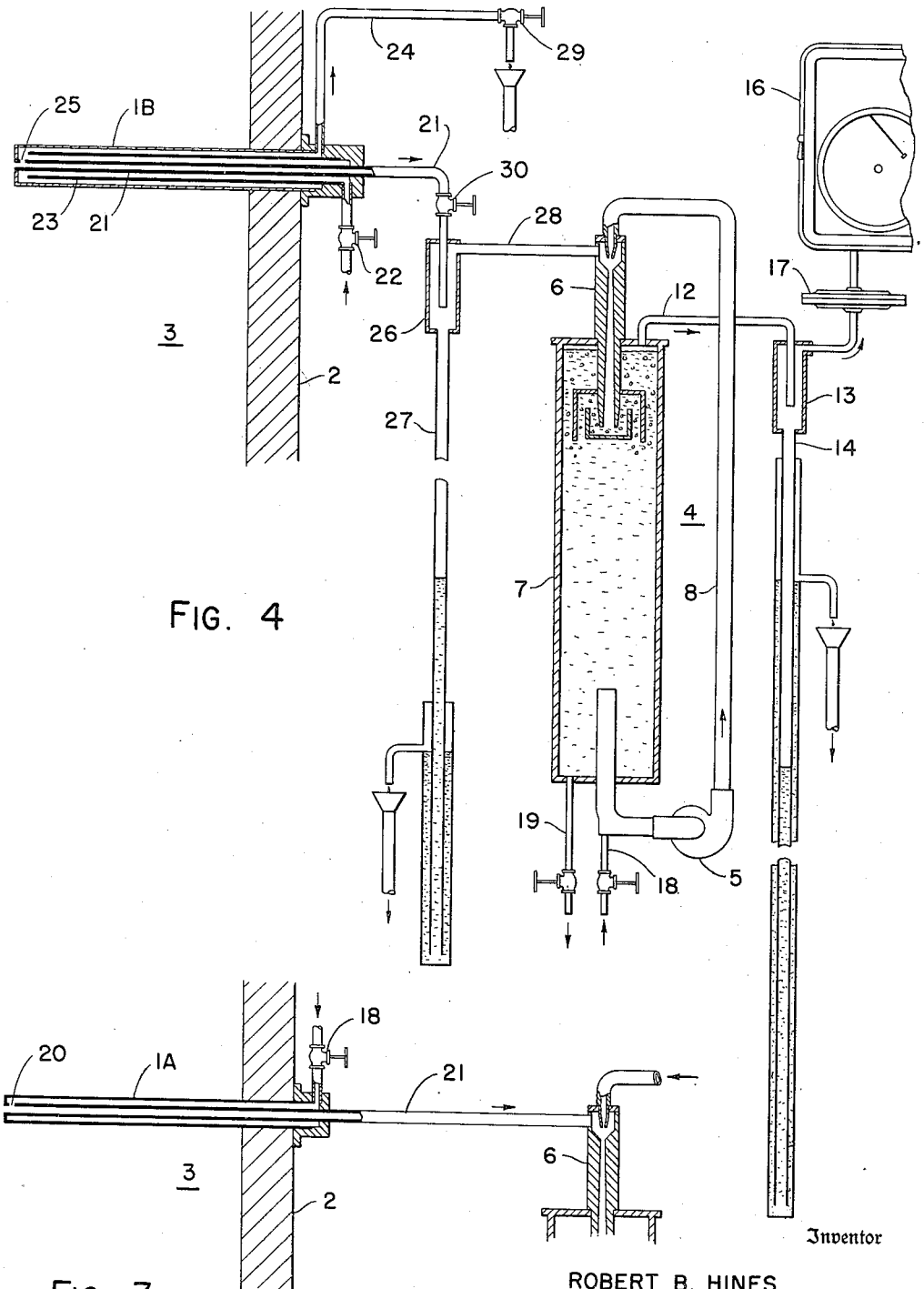

Aug. 29, 1944.  R. B. HINES  2,356,845
GAS ANALYZING APPARATUS
Filed Aug. 14, 1941  4 Sheets-Sheet 3
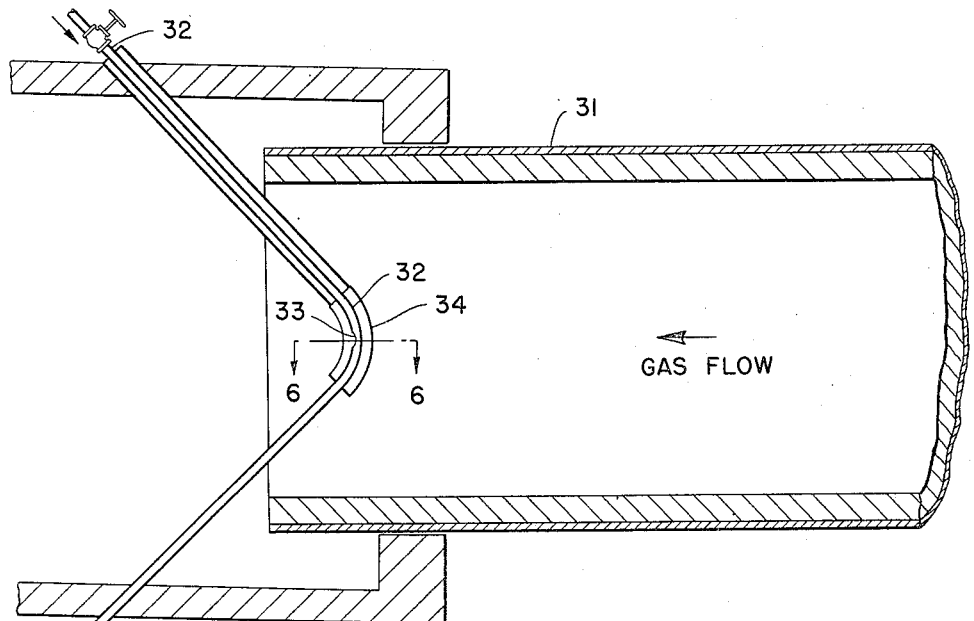
FIG. 5
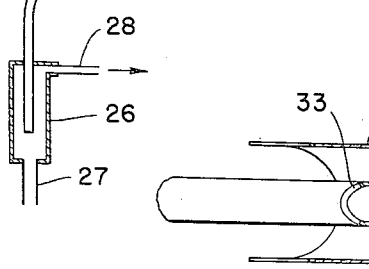
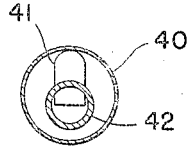
FIG. 6  FIG. 10
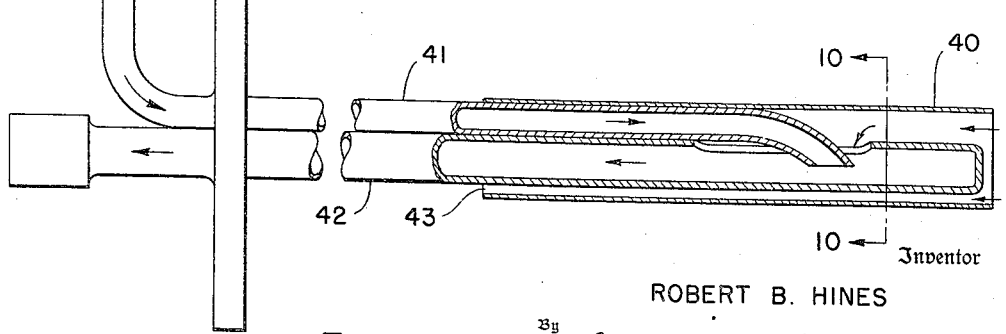
FIG. 9
Inventor
ROBERT B. HINES
By Raymond W. Jenkins
Attorney Aug. 29, 1944.  R. B. HINES  2,356,845
GAS ANALYZING APPARATUS
Filed Aug. 14, 1941  4 Sheets-Sheet 4
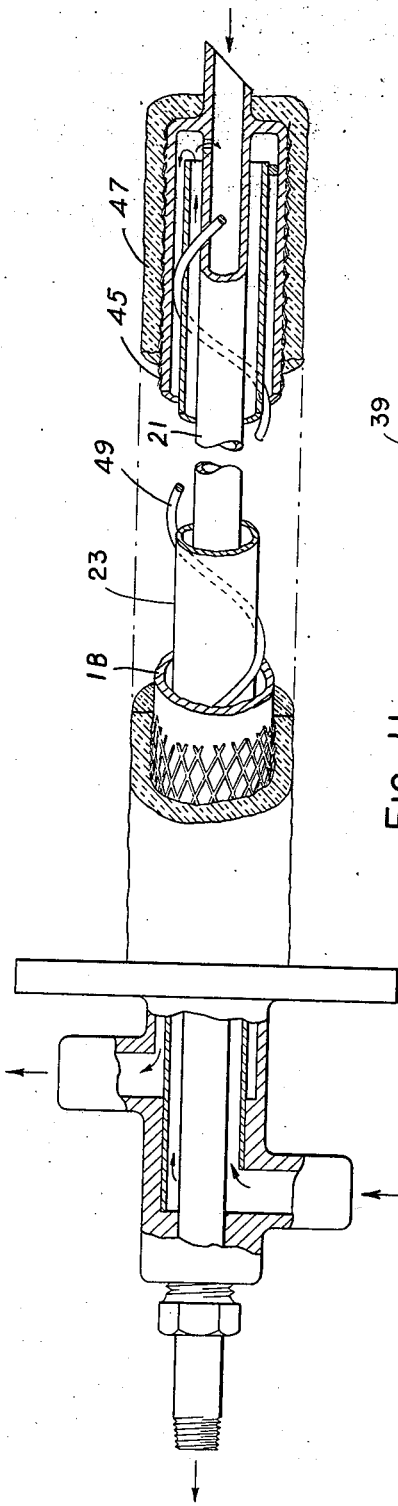
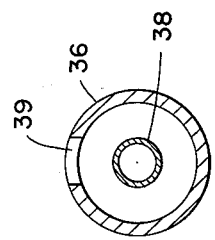
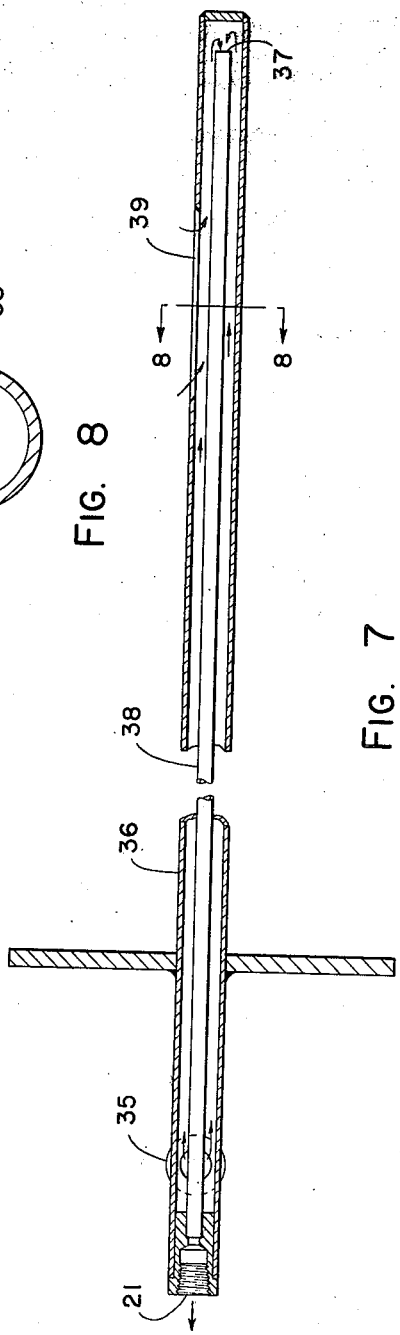
Inventor
ROBERT B. HINES
By Raymond D. Jenkins
Attorney Patented Aug. 29, 1944

2,356,845

UNITED STATES PATENT OFFICE 2,356,845

GAS ANALYZING APPARATUS

Robert B. Hines, Cleveland, Ohio, assignor to Bailey Meter Company, a corporation of Delaware Application August 14, 1941, Serial No. 406,838

11 Claims. (Cl. 23—254)

This invention relates to the art of gas analysis and particularly to the problem of properly obtaining a sufficient and clean sample of the gas to be analyzed.

Those familiar with the art are well aware of the many ways which have been developed and put into practice for analyzing gas, such as fuel gases and flue gases, to determine qualitatively or quantitatively the composition of such gases and the percentage of the various constituents of a gaseous mixture.

Regardless of the method or apparatus employed in analyzing the gas, it is essential that the gas sample be cleaned of deleterious material before it is introduced into the apparatus. In most instances it is desirable that the sample be delivered to the analyzing apparatus in a continuous stream. If, for example, the gas to be analyzed is flue gas from a furnace it is highly desirable to minimize the time lag between change in composition of the gases being sampled and the ascertainment of the analysis. This predicates speed in obtaining the sample and supplying it to the analyzer. Furthermore, the sample must be adequately cleansed of moisture, dust, etc. before reaching the analyzer.

The problem to which the present invention is directed is, therefore, to the supplying to any type of gas analyzing apparatus of a sufficient, continuous, clean flow of gas to be analyzed. In particular, I am concerned with the analyzing of a continuous sample stream of gaseous products of combustion to ascertain the percentage of free oxygen therein as indicative of the excess air supplied to the combustion process.

In the drawings, in which like parts have been given the same reference numerals:

Fig. 1 is a diagrammatic showing of a gas analyzer-recorder with apparatus for supplying thereto a cleaned sample flow of gas to be analyzed.

Fig. 2 diagrammatically illustrates a modification of a portion only of Fig. 1.

Fig. 3 shows another arrangement of a portion of Fig. 1.

While Figs. 1, 2 and 3 illustrate systems complete and satisfactory for certain types or conditions of operation, they may also be considered as illustrating to some extent the progression in development leading to the more complete embodiment of my invention disclosed diagrammatically in Fig. 4 for sampling very hot and very dirty flue gases.

Fig. 5 illustrates the invention applied to a cement kiln.

Fig. 6 is a detail of Fig. 5, namely, a section along the line 6—6 of Fig. 5.

Figs. 7, 9 and 11 illustrate different forms which the sampling tube per se may take.

Fig. 8 is a detail of Fig. 7, namely, a section along the line 8—8 of Fig. 7.

Fig. 10 is a section along the line 10—10 of Fig. 9.

Figures 1, 2:
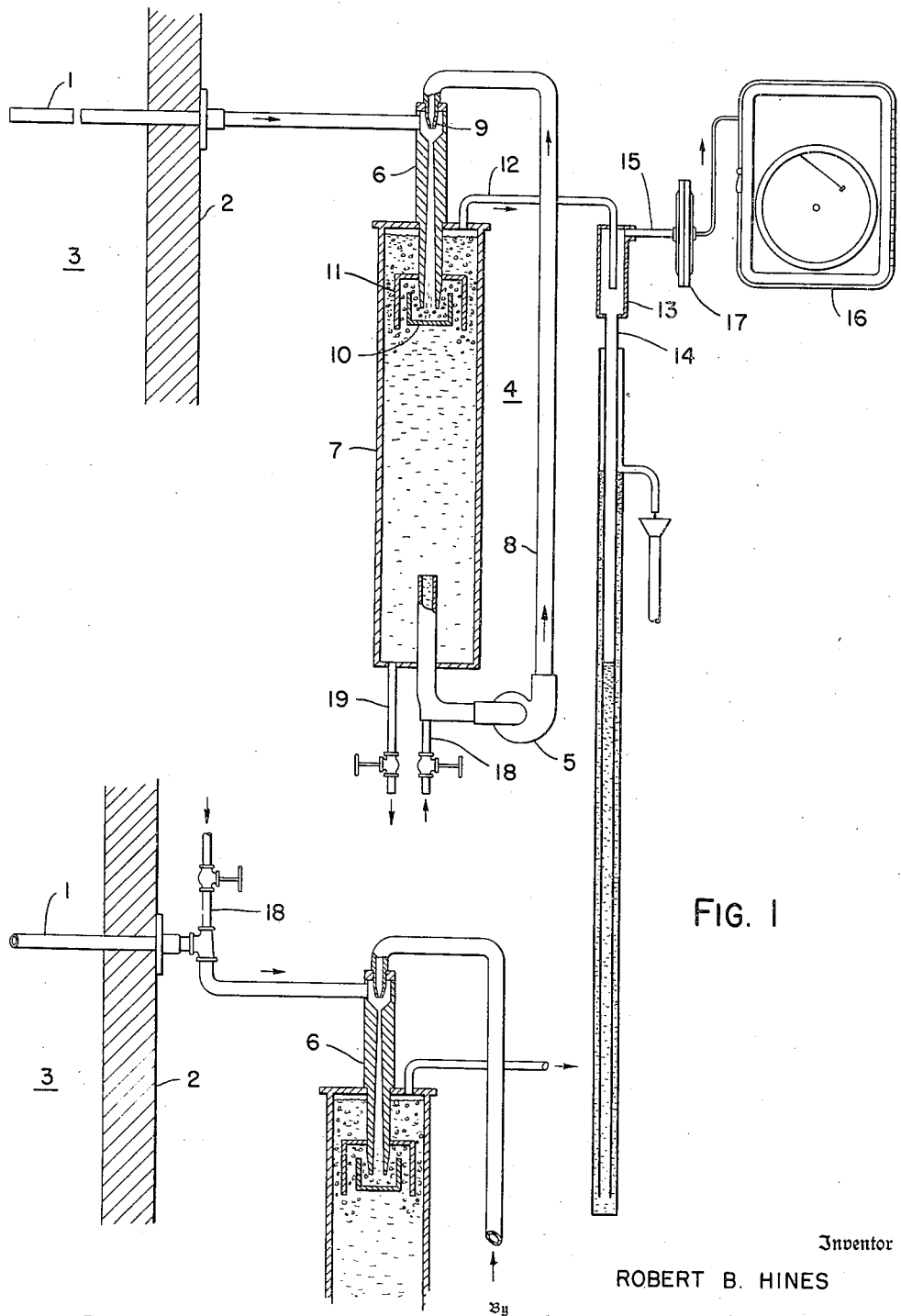

I will describe the arrangement illustrated as used in continuously quantitatively analyzing the gaseous products of combustion from a furnace, and making a chart record of the percentage of free oxygen in the flue gases as indicative of the completeness of combustion or of the excess air supplied the furnace to burn the fuel provided. It will, however, be clearly understood that such an example is illustrative only and is not to be considered as limiting in any respect, for clearly I may adapt and use my invention in the analyzing of fuel gases, flue gases, exhaust gas from automobiles or Diesels, etc., and the analysis may be with respect to any constituent of the gaseous sample.

Referring now particularly to Fig. 1, I illustrate an open end sampling tube 1 projecting through the wall 2 of a furnace into the path 3 of the products of combustion leaving the fire. The pipe 1 may or may not be separately water cooled where it projects within the space 3, depending upon the temperature encountered and the expected deterioration of the tube material from heat and corrosion.

Located as close to the wall 2 as is practical, is a recirculating aspirating system generally designated as 4. The principal parts of the system 4 include a pressure pump 5, an aspirating cone 6 and a washer 7. It will be found that I employ substantially the same system 4 in the various arrangements which I have illustrated and will describe, and therefore the following detailed description of the recirculating system 4 in connection with Fig. 1 will not be repeated in describing the other figures of the drawings.

The centrifugal pump 5 may be driven in any convenient manner, preferably by an electric motor. Water is drawn from the washer 7 by the pump 5 and discharged through a pipe 8 to a nozzle 9 at the entrance of the aspirator cone 6. The pipe 1 joins the cone block 6 in proper relation to the nozzle, so that the pressure flow of water leaving nozzle 9 and entering aspirator cone 6 will suck in a continuous flow of gases from the sampling pipe 1 in well known manner. The mixture of water and gas leaving the cone 6 impinges upon a disintegrator plate 10 completely breaking any bubbles of gas or slugs of water, and assisting in mixing the gas and water in finely divided form. The disintegrator 10 is cupped to reverse the flow of water-gas mixture against an inverted cup 11, whereby the direction of travel of the liquid-gas mixture is again reversed. Emerging downwardly from the annulus formed by the cups 10, 11 the mixture enters the main body of liquid in chamber 7 and the gas separates and rises. The gas leaves chamber 7 under pressure through a pipe 12 opening into a chamber 13 having a liquid sealed drop leg 14 in which any entrained moisture carried over with the gas collects. From chamber 13 the sample flow is forced through pipe 15 to the analyzer 16. Intermediate there may be a porous stone or other filter 17 if necessary.

I would like to point out that the showing of Fig. 1 is diagrammatic and not to scale. The analyzer 16 has been shown to small scale, while the recirculating system 4 has been shown to relatively large scale. The system 4 is shown substantially equidistant from the sampling tube 1 and the analyzer 16, whereas actually I desirably locate the system 4 as close to the wall 2 as is practical, and this may be a considerable distance from the analyzer 16. As a matter of fact a principal advantage of the system being described is that the lines and fittings substantially all of the way from the wall 2 to the analyzer 16 are under pressure, and therefore it is entirely immaterial as to whether the analyzer 16 is close to the point of sampling or far away. This is because with the system under pressure there is no difficulty in connection with leaks. Any leakage is outward and means only a small loss of the excessively large gas sample being supplied to the analyzer 16. If, however, the system were under suction rather than pressure, then any leakage of fittings or at filters would mean an inward leakage of dilutant atmospheric air resulting in an inaccurate composition of the gas it is desired to analyze.

It will, therefore, be seen that while the system 4 (the pressure creating washing system) is desirably located as close to the point of sampling as is possible, at the same time the piping 12 and 15 may be of a very appreciable extent, limited only by the pressure drop and the pressure available from the pump 5. It is quite practical to locate the analyzer 16 several hundred feet from the point where the sampling tube 1 is located, and such distances will of course satisfactorily take care of most requirements of location.

Due to the great turbulence experienced in the chamber 7 there will be some liquid carried over through the pipe 12 into the drop leg 14, and eventually to waste. This liquid must be replaced, and therefore I provide a make-up line 18 which may be connected to the city water supply and in which a valve may be left cracked a sufficient amount to continually supply the make-up necessary. A drain pipe 19 is provided for draining the chamber 7 of accumulated dirt or sediment or for continually bleeding the chamber 7 in small amount.

The question might well be raised as to why I provide a recirculating system 4 rather than supplying the nozzle 9 directly from a source of pressure supply, as for example, the city water supply, and allowing all of the water passing the aspirator cone to go to waste. There are two particular reasons for this, the first being to provide a source of pressure for the gas sample substantially all of its travel from the sample tube 1 to the analyzer 16, and the second being to prevent the continual contact of gas absorbing fresh water with the gas sample flow.

At the present time a number of commercial gas analyzing systems employ a water aspirator for drawing a gas sample from a furnace, but so far as I am aware they in every instance locate such an aspirator on the discharge side of their analyzing apparatus, thus providing a suction in the entire pipe line and fittings from the furnace to and through the analyzer. As previously mentioned, such a suction system, if even the tiniest leak should develop, will result in infiltration of dilutant atmospheric air, and the gas sample stream arriving at the analyzer will not be truly representative of the gas in the space 3 which is desired to be analyzed. Thus I have a decided advantage over the systems of which I am now aware in providing a pressure supply of gas throughout substantitally the entire piping system and including the analyzer. I may in this manner withdraw from the furnace, and carry through the piping system, a great excess of gas at relatively high velocity. The sample withdrawn through the pipe 1 may be ten or more times that which is actually required by the analyzer. Thus I may desirably or unintentionally lose a portion of this sample along the path of flow, and throw the rest of it away at the analyzer, and still be assured that that portion of the sample flow which I actually analyze is not diluted by any infiltration of air. Furthermore, the system provides a pressure and velocity of sample flow many times greater than is the suction and velocity of flow in the present commercial types provided with an aspirator on the outlet side of the analyzer. This high velocity flow means, of course, a minimizing of the time lag between a change in composition of the products of combustion in the space 3, and the time when such change of composition is actually indicated or recorded by the analyzer 16. It will be appreciated that if any value, in the control of combustion, is to be obtained from an observation of the analyzer 16, said analyzer must have a minimum of time lag. In other words, the more nearly instantaneously is the sample taken in the pipe 1 analyzed and its analysis indicated, the greater the commercial value of the system.

In the system which I have described, I may allow a certain amount of water to continuously pass with the gas through the pipe 12 to the chamber 13 so as to keep the concentration of the liquid within the chamber 7 at a desirable value. This dictates that I must allow a continuous supply of fresh make-up through the pipe 18 corresponding to the amount of dirty liquid which passes to the drop leg 14. However, it is essential that the amount of make-up supplied the chamber 7 be kept as low as is practical, both from a cost standpoint and from the standpoint of excessive absorption of certain gaseous constituents by the fresh water. In so far as the creating of a considerable gas pressure is concerned, the creating of a strong aspirating effect, a thorough washing and cleansing of the gas sample, and the providing of a very large sample flow of gas at a relatively high velocity, is concerned, I accomplish this by recirculating by means of the pump 5 a very great volume of liquid at high velocity and pressure rather than attempting to accomplish the same thing by the use of a tremendous volume of city water in once through flow to waste. Furthermore, I am recirculating at all times water which is approximately 90% fully saturated with gaseous constituents from the gas sample, and therefore providing a minimum of error from continual absorption. Of course, it is appreciated that the continual recirculation of a great volume of water in the system 4, and in contact with very hot gaseous products of combustion, might raise the temperature of the recirculated liquid to the boiling point. It is quite desirable that no steam be so produced and that the water be kept liquid at all times in the system 4. For this reason it may be necessary to slightly adjust the fresh cold make-up supply. In other words, the rate of make-up supply through the pipe 18 is dictated by the temperature of the recirculated water and by the concentration thereof.

In general, it is advantageous for speed and accuracy of analysis to transmit to the analyzer a relatively large fast sample flow of gas to be analyzed. In any aspirating system this requires the movement of a large volume of water to obtain a large volume of gas sample. Such a large volume of fresh water would absorb a very large amount of $CO_2$ and $O_2$ and thus harm the accuracy of measurement by varying the true composition of the sample flow. Such absorption would be immaterial if the aspirator were located on the outlet side of the analyzer and the gas sample stream drawn through the analyzer under suction. However, as pointed out above, this would increase the infiltration of atmospheric air to dilute the sample and the larger the volume of sample moved and the greater the suction, the more inward leakage would be had.

Both of these difficulties are overcome by the preferred arrangement just described, in which the sample is moved throughout substantially the entire pipe line and analyzer under pressure, thereby eliminating a possibility of dilution, and by recirculating a large volume of gas saturated water in the recirculating aspirator system 4. By adding only a small percentage of fresh make-up of water to the recirculating aspirator system the large flow of aspirating water is substantially completely saturated with absorbed gas, thus minimizing the inaccuracy which might be caused by the absorption of either $CO_2$ or $O_2$ in the aspirator water from the gas sample. Furthermore, a much more efficient cleansing of the gas sample is accomplished by its complete intermingling and washing with the large volume of aspirator water as compared to present systems having an aspirator on the outlet side of the analyzer. In the latter, the dry, dirty gas must pass through filters prior to reaching the analyzer. These are subjected to relatively high temperature of the gas sample if located adjacent the boiler wall. If located closer to the analyzer, then the main portion of the piping and fittings are contacted by hot and dirty gases and soon clog and fill up or greatly reduce the volume flow of sample gas to the analyzer. All of these difficulties are minimized or eliminated through the pressure system I have described, using the recirculating aspirator circuit and moving a very large volume of gas-saturated washing and aspirating water through the cone 6.

Referring now to Fig. 2, I show a modification of the complete arrangement of Fig. 1, wherein the make-up pipe 18 joins the sample pipe immediately adjacent the outer side of the boiler wall 2, and passes with the sample stream into the cone 6 through whatever piping is necessary. The make-up water is added at a point where the gas is at a temperature above its dew point, i. e. over 212° F., so that the moisture in the flue gas (when reaching the dew point) would not make mud out of the fly ash or other dirt, as has sometimes caused restriction and stopping of the relatively short piping between the boiler wall 2 and the cone 6. In this arrangement the relatively small amount of make-up water to be added to the recirculating aspirator system 4 is sufficient (when added adjacent the boiler wall 2) to keep the sample flow from depositing and baking any appreciable amount of material in the line prior to the cone 6.

It will be appreciated that the arrangement of Figs. 1 and 2 may have the sample pipe 1, which projects into the path of the hot gaseous products of combustion, water jacketed by a separate flow of cooling water if found necessary to prevent deterioration or burning of the sampling pipe. The arrangement of Fig. 1 is used where the gases are fairly clean and where little difficulty is expected or encountered in the depositing of dust or mud from the dust in the short pipe prior to the cone 6. What dirt is carried through the cone 6 with the gas is washed therefrom in the washer chamber 7. Fig. 2 is an arrangement used when the gases contain a greater amount of dry ash or other dust, and where difficulty may be expected from the settling of the dust or mud in the pipe preceding the cone 6.

Fig. 3 shows a further development for use when the gases being sampled are not only somewhat dirty but are at a considerable temperature. In this arrangement the sample pipe 1A consists of two concentrically located pipes, the outer comprising a water jacket for the inner pipe. The fresh make-up water supplied to the recirculator aspirating system 4 is supplied through the pipe 18 to the cooling jacket of the sampler 1A, and passes from the jacketing pipe to the inner pipe through a small hole 20 immediately adjacent the open end of the pipe 21 which leads to the cone 6. This provides a further very important feature of the present invention, which I term "wet sampling," of introducing water into the sampling pipe immediately at the point where the gas sample stream enters the sampling pipe, thus keeping the gas sample stream wet throughout its entire passage to the recirculating aspirator system 4.

This arrangement is used at a fairly high temperature of the gases being sampled, requiring water jacketing of the sampler tube 1A, and furthermore where a considerable amount of dry ash or other material is carried by the sample stream of gas. Sufficient water must be added so that the fluid in the jacketing portion of the sampler pipe 1A is not turned to steam, thus nullifying the cooling protection of the jacket, and so that the water entering the sampling pipe 21 through the hole 20 will not be turned into steam, for steam is dry and would not wet the sample gas flow and its dust contamination. However, under most operating conditions the amount of water added through the pipe 18, sufficient to serve as a liquid water jacket of the pipe 21 within the passage 3, keeps in liquid form throughout the pipe 21 and washes to the cone 6 all material carried by the gas sample passing through the pipe 21; and at the same time not sufficiently great to constitute more than a small percentage make-up of the water passing through the cone 6 of the recirculating aspirator system 4.

Fig. 4 illustrates a preferred, complete arrangement particularly useful where the gas flowing through the passage 3 (to be sampled) is at a high temperature and very dirty. The recirculator aspirating system 4 is similar to that previously described, includes a make-up supply 18, and furthermore constitutes a completely separate aspirating pressure washing cycle entirely separate from a second water jacketing washing liquid system providing wet sampling.

This incorporates water jacketing of the sample pipe 21 for cooling and protecting the same, and introducing water for wetting and washing the gas sample immediately adjacent the point where the gas sample stream enters the sample pipe 21. Referring now particularly to Fig. 4, I show an entirely separate source of fresh water supply admitted through a valve 22 to a sampling tube 1B. The sampling assembly 1B comprises three concentrically assembled pipes. The fresh water in relatively large volume flow entering through the valve 22 passes through the annular space between a pipe 23 and the sample pipe 21 for cooling the same. At the open end of the pipe 23 the water in main portion reverses and flows back through an annular space between the pipe 23 and the outer jacket 1B to a drain pipe 24. Adjacent the open end of the pipe 23 is a small hole 25 into the sample pipe 21. Thus a small flow of the jacketing water is introduced through the hole 25 into the sample pipe 21 and flows with the gas sample to the chamber 26 and a liquid-sealed drop leg 27. From the chamber 26 relatively dry, clean gas flows through the pipe 28 to the cone 6. Adjustment of the valve 22 regulates the total flow of cooling water through the assembly 1B, while adjustments of the valves 29 and 30 regulate the proportion of said cooling water which passes to waste and the proportion which passes with the gas sample to the chamber 26. It will be appreciated that if the valve 29 is closed down, then the amount of water entering through the opening 25 into the sampling pipe 21 will be increased. If at the same time the valve 30 is opened slightly, then a proportionately greater percentage of said washing water will pass with the gas sample through the collecting chamber 26. If the valve 30 is closed downwardly, however, some of the water entering the tube 21 through the hole 25 will pass out through the open end of the tube 21 into the furnace. In certain instances this is highly desirable to wash free the open end of the tube 21 and prevent an accumulation of mud or dirt in this opening, which accumulation would decrease the volume of gas sample being drawn in by the aspirator system.

In this arrangement a relatively large volume of wash water is introduced to the gas sample flow immediately adjacent the entrance of gas to the sample pipe 21, washing the pipe 21 free at all times of any tendency to accumulate or collect dirt and washing such material into the chamber 26 and drop leg 27 so that a relatively clean sample flow passes through the pipe 28 to the cone 6. I have found that in sampling gas volume at very high temperature and containing a very great amount of dirt and dust, that the arrangement of Fig. 4 is highly effective and advantageous and that "wet sampling," i. e. the introduction of a considerable flow of water immediately with the entrance of the gas sample to the sampling tube is highly advantageous in preventing any accumulation of dirt or mud in the sample pipe with consequent reduction in flow of the sample to the remainder of the system.

In the preferred form of Fig. 4 two separate liquid systems are shown, wherein fresh water may be used in any desired volume for cooling the sampling pipe 1B and for wet sampling or washing the sample into a collecting chamber 26. The second system being the recirculating aspirator system 4 for thoroughly washing the sample, aspirating the sample from the furnace 3, and providing a clean sample flow under pressure to the analyzer 16.

One particularly difficult problem in providing a large volume clean sample flow is in connection with the obtaining of such a flow from a cement kiln where the temperatures of the gases are extremely high and where the gases carry a very large amount of dirt, dust and cement powder. Such cement dust will completely clog an ordinary sampling tube or dry filters in a period of hours and render an ordinary sampling system useless. I have found that this difficulty may be overcome and an entirely satisfactory sample flow of clean gas obtained from a cement kiln by the use of my preferred system of wet sampling in combination with the recirculating pressure system described.

Referring, for example, to Fig. 5, I show in diagrammatic form a section through a rotating cement kiln 31 at the outlet end thereof, and with an arrow indicating the direction of gas flow. A relatively large flow of wash water is admitted through the pipe 32 passing through the sampling pipe into the collecting chamber 26. The water flow is great enough not only to completely wet and wash the sample pipe 32 throughout its length, but to allow some water to dribble outward from the sample hole 33, where it is vaporized by the main gas flow.

Fig. 6 is a section along the line 6—6 of Fig. 5 showing the sample tube 32 with a small opening 33 therein facing away from the gas flow and with the elbow of the sampling tube 32 protected at this point by a shield 34 against impingement of the very high temperature dirt-laden gas flow.

In the embodiment described as to Figs. 3, 4 and 5 comprising what I have called "wet sampling" it is expected that under certain conditions of operation a small amount of water may pass outwardly into the main gas flow from the entrance opening to the sample tube, but this flow or dribble is readily controlled in amount and is never sufficient to do damage to the tubes of a vapor generator, but only sufficient to keep material from accumulating in mud or baked form around the gas entrance, and thus eventually clogging or closing it. The small amount of water entering the main gas path through such an opening is almost instantly vaporized by the hot gases and passes away with them.

Fig. 7 is another arrangement commercially useful in connection with the kiln 31 of Fig. 5 more readily adapted for removal and replacement or inspection during operation of the kiln, inasmuch as it enters the kiln hood from one point only and may therefore readily be removed. In this arrangement the wash water is admitted through a pipe opening 35, flows through a jacket 36 and with the gas sample enters the open end 37 of an inner pipe 38. The water and gas passing through the pipe 38 to the discharge opening 21 and a collecting chamber 26. A feature of this arrangement is the slot 39 which is milled in the outer tube 36 for entrance of the gas sample and some discharge of water outwardly. By positioning the assembly relative to the gas flow and rotating it slightly from the horizontal or vertical, the amount of liquid which passes outward through the slot 39 may be readily controlled, as well as the position of the slot relative to direct impingement of the flowing gas stream.

Fig. 8 is a section along the line 8—8 of Fig. 7.

Fig. 9 (and its section Fig. 10) illustrates a commercial arrangement wherein the sampling assembly is subjected to some flow of gas to be sampled through the open right-hand end of a jacketing tube 40, past the pipes 41, 42 and out the jacketing space 43. Water is admitted through the pipe 41 into the closed end pipe 42 having a slot as shown through which the gas sample enters the pipe 42 and through which some water may discharge to the furnace.

Another commercial form for very high temperature gas sampling is shown in Fig. 11. The basic design is similar to that shown in Fig. 4, with the whole assembly first covered by a layer 46 of expanded metal lath rolled to shape and tack welded to the tube IB as necessary. On this is formed a covering 47 of plastic chrome ore which hardens or fuses into a refractory protection for the assembly. The annular space between the tube 23 and the outer jacket is provided with a spiral passage for the cooling water by tack welding a spiral wire 49 as shown.

With the arrangement (such as Fig. 4) which I have described for wet sampling with the wash water entering immediately adjacent the entrance of the gas sample, I would point out that I do not depend upon the flow of the water which enters the sampling tube to carry and promote the flow of gas sample, but depend upon the aspirating system 4 providing the suction which pulls the gas sample with the wash water through the sampling pipe. This suction opposing the pressure of the wash water inhibits the discharge of too great a quantity of wash water through the opening to the sample tube through which the gas sample flow enters. Thus the wash water admitted under pressure to a location adjacent the gas entering opening is immediately (with the gas) subjected to the suction effect of the aspirating system, but a small amount of the wash water may splash or dribble out of the opening to keep it washed clean.

What I claim as new, and desire to secure by Letters Patent of the United States, is:

1. A gas sampling arrangement for drawing and cleaning a continuous sample flow of the products of combustion from a rotating kiln, comprising a water carrying conduit traversing the space across the open discharge end of the rotating kiln, a supply of water for the conduit, said conduit provided with an opening subsequent to its point of water supply and away from impingement by the gases leaving the kiln, and an aspirating system connected to the outlet of the conduit continually drawing a mixture of wash water and gas sample from said conduit.

2. A gas sampling tube for insertion into a space from which a sample of gas is to be extracted through the tube, comprising, a jacketing tube surrounding and sealed at one of its ends to an end of a central sample pipe, a concentric tube intermediate the jacket and central pipe and falling short of meeting the sealed end of the jacket tube, means providing a flow of cooling liquid in one direction through the annulus between the central pipe and concentric tube and in the opposite direction between the concentric tube and the jacketing tube, the central pipe provided with a small opening communicating with the flow of cooling water adjacent to the said end of said central pipe to admit liquid to the central pipe whereby the central pipe conducts a wet sample of the gas.

3. A gas sampling tube as in claim 2 including provision for spirally flowing the cooling liquid though the annulus between the jacket tube and the central tube.

4. In combination with means defining a gas flow path, apparatus for continuously sampling gas from the gas flow path, comprising, a sampling pipe extending within the gas flow path and having an inlet open thereto, there being a continuously open aperture in the sampling pipe adjacent said inlet and means defining a path for liquid to said aperture for introducing a wash liquid into the sampling pipe at a point immediately adjacent its gas inlet whereby the liquid mingles with the gas in the pipe and continuously washes the walls of the latter.

5. In combination with means defining a gas flow path, apparatus for continuously sampling gas from the gas flow path, comprising, a sampling pipe extending within the gas flow path and having an inlet open thereto, a suction means connected to said sampling pipe exterior of the means defining the gas flow path, there being a continuously open aperture in the sampling pipe close to said inlet and means defining a path for water to said aperture for introducing water into the sampling pipe at a point ahead of the suction means whereby the water and gas are delivered to the suction means together and serve to clean the interior of the sampling pipe.

6. In combination with means defining a gas flow path, apparatus for continuously sampling gas from the gas flow path, comprising, a sampling pipe extending within the gas flow path and having an inlet open thereto, a water operated aspirator connected to the sampling pipe exterior of the means defining the gas flow path, a continuously open aperture in the sampling pipe close to said inlet and means defining a path for water to said aperture for introducing water into the sampling pipe at a point within the means defining gas flow path and adjacent the inlet of the sampling pipe whereby the same is delivered to the aspirator with the gas and mingles with the water therefrom.

7. In combination with means defining a gas flow path, apparatus for continuously sampling gas from the gas flow path, comprising, a sampling pipe extending within the gas flow path and having an inlet open thereto, a water actuated aspirator connected to the sampling pipe exterior of the means defining the gas flow path, means including a fixed aperture in the sampling pipe near said inlet and a conduit for introducing water into the sampling pipe at a point ahead of the aspirator, a gas analyzer and conduit means connecting it to the sampling pipe at a point behind the aspirator, whereby gas will be initially drawn by suction through the sampling pipe to the aspirator and subsequently forced under pressure to the gas analyzer and the water entering the sample pipe will mingle with that of the aspirator, and a water sealed chamber connected in said conduit between the aspirator and analyzer to separate said water from the gas delivered to the analyzer.

8. In combination with means defining a gas flow path, apparatus for continuously sampling gas from the gas flow path, comprising, a sampling pipe extending within the gas flow path and having an inlet open thereto, a gas analyzer connected to the sampling pipe, a recirculating liquid pressure system connected to the sampling pipe exterior of the gas flow path and at a point ahead of the gas analyzer constructed and arranged to aspirate a gas sample stream through the sampling pipe and to force said stream under pressure to the gas analyzer, means for continually bleeding a portion of the recirculating liquid from the liquid pressure system to waste, and means including a fixed aperture in the sampling pipe adjacent said inlet and a tube for introducing liquid into the sampling pipe at a point immediately adjacent its gas inlet to clean the sampling pipe and provide the makeup liquid to replace that lost by bleeding.

9. In combination with means defining a gas flow path, apparatus for continuously sampling gas from the gas flow path, comprising, a sampling pipe extending within the gas flow path and having an inlet open thereto, and a water cooled jacket surrounding the sampling pipe within the gas flow path, said sampling pipe and water cooled jacket being in fluid communication adjacent the gas inlet of the sampling pipe so that the cooling water of the jacket is admitted to the gas sample stream.

10. Apparatus for sampling gases to be analyzed including in combination, a sampling pipe adapted to be extended within a gas flow path to be sampled and having an inlet open thereto, and a water cooled jacket surrounding the sampling pipe adjacent the inlet thereof, said sampling pipe and water cooled jacket being in restricted fluid communication adjacent the inlet of the sampling pipe, and said water cooled jacket being provided with cooling water inlet and outlet connections.

11. In combination with means defining a gas flow path, apparatus for continuously sampling gas from the gas flow path, comprising, a sampling pipe extending within the gas flow path and having an inlet open thereto, a gas analyzer connected to the sampling pipe, a recirculating liquid pressure system, including a pump, connected to the sampling pipe exterior of the gas flow path and at a point head of the gas analyzer constructed and arranged to aspirate a gas sample stream through the sampling pipe and to force said stream under pressure to the gas analyzer, and means including a fixed aperture in the sampling pipe adjacent said inlet and a tube for introducing liquid into the sampling pipe at a point immediately adjacent its gas inlet, said means being arranged to provide a sufficient quantity of liquid so that small amounts may escape through the sampling pipe to wash the same clean.

ROBERT B. HINES.